(12) United States Patent
Cordani

(10) Patent No.: US 9,421,403 B2
(45) Date of Patent: Aug. 23, 2016

(54) AMPHIBIOUS AIRCRAFT FIRE FIGHTING ENHANCEMENT

(71) Applicant: GelTech Solutions, Inc., Jupiter, FL (US)

(72) Inventor: Peter Cordani, Palm Beach Gardens, FL (US)

(73) Assignee: GelTech Solutions, Inc., Jupiter, FL (US)

( * ) Notice: Subject to any disclaimer, the term of this patent is extended or adjusted under 35 U.S.C. 154(b) by 0 days.

(21) Appl. No.: 14/885,389

(22) Filed: Oct. 16, 2015

(65) Prior Publication Data

US 2016/0107011 A1 Apr. 21, 2016

Related U.S. Application Data

(60) Provisional application No. 62/065,052, filed on Oct. 17, 2014.

(51) Int. Cl.
| | | |
|---|---|---|
| *A62C 3/02* | (2006.01) | |
| *B64D 1/16* | (2006.01) | |
| *B64C 35/00* | (2006.01) | |

(52) U.S. Cl.
CPC ............. *A62C 3/0228* (2013.01); *B64C 35/008* (2013.01); *B64D 1/16* (2013.01)

(58) Field of Classification Search
CPC .............. B64D 1/00; B64D 1/16; A62C 3/00; A62C 3/02; A62C 3/0228; A62C 3/0242; B64C 35/00; B64C 35/008

USPC ............................ 169/53; 239/379, 569, 578
See application file for complete search history.

(56) References Cited

U.S. PATENT DOCUMENTS

| | | | | |
|---|---|---|---|---|
| 3,494,423 A * | 2/1970 | Stansbury | ................ | B64D 1/16 169/43 |
| 7,717,356 B2 * | 5/2010 | Petersen | .................. | B64D 1/18 239/171 |
| 7,992,647 B2 * | 8/2011 | Cordani | .................. | A62C 5/033 169/30 |
| 8,555,991 B2 * | 10/2013 | Cordani | .................... | A62C 3/07 169/15 |
| 9,022,133 B2 * | 5/2015 | Doten | .................... | B01F 5/0415 169/14 |
| 2008/0035354 A1 * | 2/2008 | Cordani | .................... | A62C 3/07 169/14 |
| 2009/0056957 A1 * | 3/2009 | Cordani | ................. | A62C 27/00 169/15 |
| 2009/0095494 A1 * | 4/2009 | Cordani | .................... | A62C 3/07 169/30 |
| 2010/0059237 A1 * | 3/2010 | Cordani | ................. | B64D 25/00 169/54 |
| 2013/0284462 A1 * | 10/2013 | Cordani | ................. | A62C 5/002 169/15 |
| 2014/0299412 A1 * | 10/2014 | Cordani | .................... | E06C 7/00 182/51 |

* cited by examiner

*Primary Examiner* — Christopher Kim
(74) *Attorney, Agent, or Firm* — McHale & Slavin, P.A.

(57) ABSTRACT

The instant invention relates to a system for enhancing the fire extinguishing properties of water. A volumetric screw feeder is employed to transfer super absorbent polymers from a storage vessel into a liquid reservoir employed with fire fighting equipped amphibious airplanes.

7 Claims, 1 Drawing Sheet

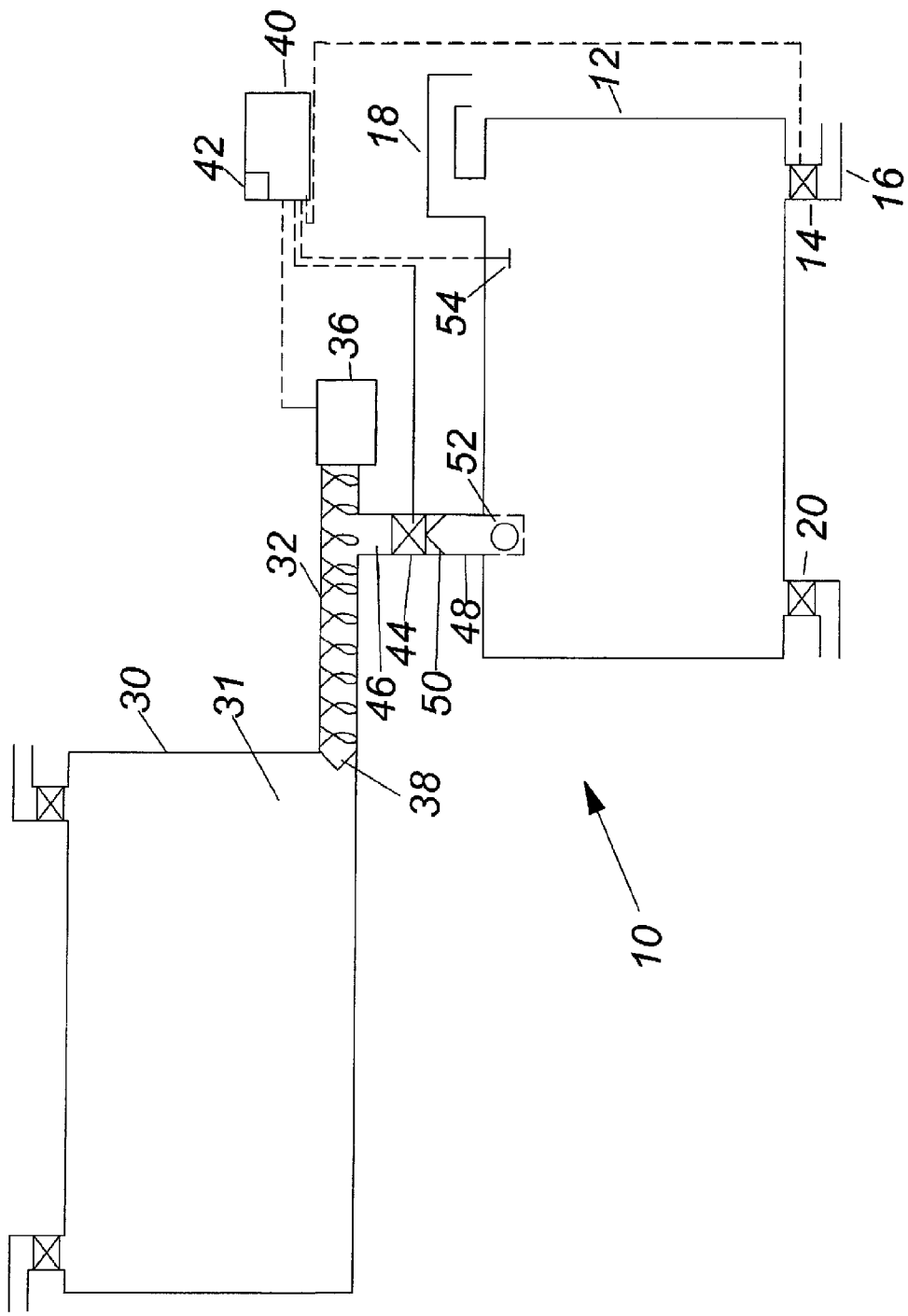

AMPHIBIOUS AIRCRAFT FIRE FIGHTING ENHANCEMENT

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/065,052, entitled "AMPHIBIOUS AIRCRAFT FIRE FIGHTING ENHANCEMENT", filed Oct. 17, 2014. The contents of the above referenced application is incorporated herein by reference.

FIELD OF THE INVENTION

This invention relates to forest fire fighting and in particular to an apparatus and method for introducing a super absorbent polymer into an amphibious aircraft in an amount sufficient to extinguish and prevent conflagrations.

BACKGROUND OF THE INVENTION

Water is well known for its fire extinguishing properties and remains the predominate material used to extinguish or prevent certain types of fires. Water has a high heat capacity and high heat of vaporization such that when water is sprayed onto a fire the water that reaches the flames absorbs the heat of the fire and cools the article to below its combustion temperature. Water also deprives the fire of oxygen. Often the heat of the fire turns a portion of water into vapor before it can reach the flames. Since water vapor is heavier than air it displaces the oxygen surrounding the fire thereby suffocating the fire. When water is dropped from an airplane a portion of the water can evaporated before reaching the fire. Water mixed with fire retardants can enhance the fire extinguishing aspects of the water.

Aircraft have become incredible fire fighting tools when the fire is located in a forest or other remote area. While a plane can hold an incredible about of water, it must land and refill the water tanks before each use. For this reason planes capable of drawing water from a lake have certain advantages. Planes such as the Bombardier 415 are capable of drawing water from a lake for use in dispensing over forest fires. The Bombardier 412 holds 1,600 gallons of water and is capable of being filled within 12 seconds while the aircraft is skimming over the surface of the water. An advantage to amphibious aircraft is that they can be refilled quickly but are not set up to include fire retardant. A significant disadvantage often encountered using untreated water to extinguish a fire is that much of the water ends up being wasted. Untreated water can evaporate before it can reach the base of the fire, where the combustible fuel for the fire resides. Further upwards of 90 of the water that does manage to reach the flames simply runs off into the ground without remaining on the trees, foliage or structure that is burning. Moreover, considerable effort must be made to continuously soak objects with water near the fire that could ignite. The evaporated and runoff water must be constantly replaced.

Ammonium phosphate fertilizer added to water is another method of firefighting used to slow and cool down a fire. Lockheed P2V's can carry 2,400 gallons of fire fighting fluid. McDonnell Douglas DC-10 may hold up to 12,000 gallons of fire fighting fluid in an exterior belly mounted tank. While this is an effective fire retardant, Forest Service officials were sued to prevent the fire retardant from being dropped near streams and lakes except when human safety is at risk. The substance consists primarily of ammonium phosphate, which has been known to kill off fish. In 2009, when ammonia in retardant dropped on wildfires near Santa Barbara, Calif., the retardant killed protected steelhead trout in the Santa Ynez River. In 2002, a slurry bomber dumped between 1,000 and 2,000 gallons of fire retardant containing sodium ferrocyanide on the Fall River south of Bend, Oreg., which immediately killed all of the river's fish, an estimated 21,000 juvenile brown trout, redband trout and mountain whitefish over a six-mile stretch. Fire retardant manufacturers have cut the ammonium in retardant over the last decade which now affects whether the material is effective.

The purpose of the fire retardant is to give firefighters time to mount a ground attack. Fire retardant is formulated to slow down the combustion of trees, brush, and grass. The ground forces clear away flammable material in a wide line around the edges of the fire. They hem in the flames and eventually a soaking rain falls or the fire just burns itself out.

What is lacking in the art is a device that will increase the effectiveness of water that is picked up by planes without landing by integrating an apparatus for introducing super absorbent polymers into amphibious aircraft.

SUMMARY OF THE INVENTION

The instant invention discloses a system for introducing super absorbent polymers into a liquid reservoir of a airplane that draws water from a lake thereby forming an admixture of water and super absorbent polymer capable of treating forest fires.

In one embodiment a screw auger inserts a predetermined amount of dry super absorbent polymer into the liquid reservoir of an amphibious airplane forming an admixture having enhanced fire fighting properties for distribution over a forest fire.

In another embodiment an eductor is positioned in the water pick-up fitting of an air plane wherein dry super absorbent polymer is admixed with the water being placed into the airplane reservoir.

An objective of the invention is to present a system that uses super absorbent polymers to transform water into an admixture effective for fire extinguishment or prevention. This admixture will bring fires under control more quickly, offering substantially less water consumption and substantially more time saving. The admixed super absorbent polymer may be applied to any source of combustible material in anticipation of a fire for fire retardation or directly at a source of combustible material already flaming for fire extinguishment.

Another objective of the present invention is to provide a device used in conjunction with an airplane providing a means for conditioning each tank of collected water.

Yet another objective of the present invention is to teach a hydrated super absorbent polymer having a viscosity that allows the polymers to be emptied through the additive inlet and the gel to be dispensed without clogging or blocking.

Another objective of the instant invention is to teach the use of a lightweight polymer that allows a tanker to be reloaded with an enhanced water product without landing. The preferred embodiment is to use 100 grams per 2.5 gallons of water.

Another objective of the instant invention is to disclose a super absorbent polymer that meets U.S. Forest Service Specifications 5100-306A and is non toxic to mammals.

Other objectives and advantages of this invention will become apparent from the following description taken in conjunction with any accompanying drawings wherein are set forth, by way of illustration and example, and certain embodiments of this invention. Any drawings contained herein constitute a part of this specification and include exemplary embodiments of the present invention and illustrate various objects and features thereof.

BRIEF DESCRIPTION OF THE DRAWINGS

FIG. 1 is a flow schematic of the system.

DETAILED DESCRIPTION OF THE PREFERRED EMBODIMENT

A detailed embodiment of the preferred embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representative basis for teaching one skilled in the art to various employ the present invention in virtually any appropriately detailed structure.

The super absorbent polymers used in combination with the fire fighting equipment discussed herein are prepared from water-soluble polymers, but have cross-linking structures that render the polymers water-insoluble. By taking water-soluble ethylenically unsaturated monomers which readily undergo vinyl polymerization, such as acrylamide, with cross-linking agents, a polymer can be produced that is of uniform small size, has a water retention capacity, is highly insoluble, but highly water-swellable (i.e., super absorbent polymer). The gel capacity refers to the property of the water-swollen polymer to resist viscosity changes as a result of mechanical working or milling. The use such polymers is disclosed in U.S. patent application Ser. No. 14/731,458 Colorized Fire Extinguishing Compositions, the contents of which is incorporated herein by reference.

Unique to airplanes is a critical center of gravity. When a wing is subjected to an airstream, lift according to Bernoullian airfoil design is generated along a line that is approximately two-thirds of the chord from the leading edge. Center of gravity must be very close to their center of lift in order to be controllable. Shifting of weight in a plane can quickly lead to an uncontrollable situation. The Bombardier 412, which holds 1,600 gallons of water and is capable of being filled within 12 seconds, transfers 6½ tons of weight onto the plane. The airplane is at max capacity so the addition of any liquid additive is not possible. However, it has been found that a large area of the plane is open and can be easily filed with dry polymer material which enhances the fire extinguishing properties.

Applicant employs a screw auger that transfers a predetermined amount of super absorbent dry powder into the liquid holding tank before water is drawn into the tank by skimming the plane over a body of water to refill the tank. The screw auger includes devices such as yoke conveyors, screw conveyors, or the like. Unique to the application is that the dry powder is very light and easily transferred.

The polymeric material is a dehydrated super absorbent polymer. The dehydrated super absorbent polymer has negligible weight when stored in a dry condition. The present invention introduces the polymer into the water for use in helping the retarding or extinguishing conflagrations or water in an amount sufficient to retard or extinguish the fire. The preferred embodiment utilizes biodegradable super absorbent aqueous based polymers sold under the trademark FIRE-ICE® which meets U.S. Forest Service Specifications 5100-306A.

Super absorbent polymer particles are capable of absorbing water in significant quantities relative to its own weight, the water-swollen gel provides a greater water laden surface area, with a higher heat capacity, than the unbound water molecule. Thus, more water actually reaches the fire without being evaporated and provides more cooling. A fire can be extinguished using less water. Aside from its water soluble properties super absorbent polymers do not harden and do not require time to "cure".

As shown in FIG. 1, a system 10 for enhancing the fire extinguishing properties of water for use with an amphibious airplane is disclosed. The amphibious airplane, such as the Bombardier 412, has a 1,600 gallon liquid holding reservoir 12. An inlet 14 to the liquid holding reservoir 12 consists of a scoop 16 that is skimmed along the surface of a water source which allows the filling of the liquid holding reservoir 12 in about twelve seconds. A tank relief 18 prevents over-pressurizing of the liquid reservoir 12 during filling and permits air replacement during release. A release bay 20 is operated by the airplane crew for release of liquid held within the liquid reservoir 12.

The storage vessel 30 is placed within the fuselage of the airplane. The storage vessel 30 can be a plastic container or individual bags containing super absorbent polymeric material. A volumetric screw feeder 32 is attached to the storage vessel 30 for introducing a predetermined amount of super absorbent polymeric material into said liquid reservoir 12. The screw feeder 32 employs an injection screw 34 that is gear driven by an electric motor 36. The polymer placed with the storage vessel 30 flows freely to the inlet 38 of the injection screw 34. Alternatively an eductor can be placed in the intake line 14 to eliminate the need for a screw feeder. The eductor operates to drawn dry power into the water stream during the filing of the reservoir.

The super absorbent polymer is capable of absorbing water up to several thousand times its own weight. The super absorbent polymer is prepared from water-soluble polymers, but have cross-linking structures that render the polymers water-insoluble. By taking water-soluble ethylenically unsaturated monomers which readily undergo vinyl polymerization, such as acrylamide, with cross-linking agents, a polymer can be produced that is of uniform small size, has a high gel capacity, is highly insoluble, but highly water-swellable (i.e., super absorbent polymer). The super absorbent polymeric material is selected from the group consisting of cross-linked modified polyacrylamides, potassium acrylate, polyacrylamides, sodium acrylate, carboxymethylcellulose, alginic acid, cross-linked starches and crosslinked polyaminoacids.

To achieve maximum fire extinguishing properties, about 3 tablespoons the polymer is added to about 2.5 gallons of water. This allows the plane to carry an extensive amount of polymer which is essentially weightless allowing the amphibious aircraft to carry a very large volumetric amount of dry polymer without affecting the weight/balance of the plane. This allows the plane to refill the liquid vessel many times with the enhanced fire fighting admixture before landing. The goal would be to match the storage vessel capacity with the estimated loads the plane can carry before landing for refueling.

Before liquid is added to the liquid reservoir 12, a volumetric amount of polymer is added to the liquid reservoir 12. The liquid reservoir 12 is then filled with water when the plane skims across a body of water, such as a lake, wherein the scoop 16 is opened to receive water into the liquid reservoir 12. The large influx of water creates an immediate mixing of water and polymer. Within the time the plane returns to the fire area the polymer is fully saturated with water.

A controller 40 is preferably provided to a crew member wherein the electric motor 36 is remotely controlled to introduce a volumetric amount of polymer material. The controller 40 includes a timer 42 to allow operation of the electric motor 36 for a predetermined amount of time. The result is operation of the screw feeder 32 for the predetermined amount of time causing transfer of a calculated amount of dry super absorbent polymer from the storage vessel 30 into the liquid reservoir 12. A valve 44 is positioned between the exit 46 of the screw feeder 32 and an inlet 48 of the liquid reservoir 12. The valve 44 is a normally closed solenoid valve to prevent the flow of fluid from entering the screw feeder and saturating the super absorbent polymer before placement within the liquid reservoir 12. In an open position only, the super absorbent polymer is permitted to be passed into the liquid reservoir 12. The valve 44 is coupled to the controller 40 allowing simultaneous operation with electric motor 36. A check valve 50, such as a Tideflex duckbill style check valve designed for passage of powder material, operates as backup to the solenoid valve 44. In addition, a stainless steel ball valve 52 prohibits flow of water into the solenoid valve 44 recalling that the tanker flow rate into the liquid reservoir 12 is 1600 gallons within 12 seconds. To prevent accidental operation of the electric motor 36 when the liquid reservoir 12 is filled, the controller 40 is electrically coupled to the level sensor 54 located within the liquid reservoir 12. Operation of the controller 40 provides electrical control of the solenoid valve 44 only when the liquid reservoir 12 is empty. Mechanical redundancy is provided by the check valve 50 that allows singular passage of the polymer powder. In addition, steel ball valve 52 blocks the inlet 48 during the inrush of water caused when the scoop 16 is placed in the water and the inlet solenoid 14 is opened. Preferably the inlet 14 is coupled to the controller 40 to disable operation of the screw feeder 32 and solenoid valve 44 when the scoop 16 is open.

The result is the screw feeder 32 introduces a predetermined amount of super absorbent polymeric material 31 stored within the storage vessel 30 to be transferred into the liquid reservoir 12 when the liquid reservoir 12 is empty. The liquid reservoir 12 is then available for dispensing the admixture of polymer and water thereby enhancing the fire extinguishing properties of the water.

When the polymer material 31 is added to the water, a super absorbent gel-like substance is formed. In a dry state the preferred polymer may be considered a particle having a diameter less than 4000 microns but greater than 50 microns. In a swollen state the particle may have a diameter greater than three hundred times its original diameter in a dry state (more surface area). In a totally water-swollen state, the particles contain up to 99.98 weight percent of water and as little as about 0.1 weight percent of polymer. Thus, such particles could hold an amount of water from ten to thousands of times their own weight.

Without wishing to be bound to any particular theory it is believed that since the polymer particles are capable of absorbing water in significant quantities relative to its own weight, the water-swollen gel provides a greater water laden surface area, with a higher heat capacity, than the unbound water molecule. More water actually reaches the fire without being evaporated and provides more cooling. Thus, a fire can be extinguished using less water.

The reaction of the water with the polymer creates a gel-like substance with a viscosity that allows the mixture to be dropped with greater accuracy and viscous enough to cover and adhere to vertical and horizontal surfaces of structures to act as barrier to prevent fire from damaging such structures, minimizing the manpower and water supply needed to continuously soak these structures. The material can be colored to enhance visually depiction of water drops, both in the air and coatings on the ground.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/FIGURES.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention. Although the invention has been described in connection with specific preferred embodiments, it should be understood that the invention should not be unduly limited to such specific embodiments.

What is claimed is:

1. A system for enhancing the fire extinguishing properties of water for use with an amphibious airplane having a liquid reservoir, said system comprising:
    a storage vessel containing super absorbent polymeric material;
    a volumetric screw feeder for introducing a predetermined amount of super absorbent polymeric material into said liquid reservoir;
    a controller to operate said volumetric screw feeder;
    a valve to prevent water from entering said screw feeder;
    wherein said screw feeder introduces a predetermined amount of super absorbent polymeric material into said liquid reservoir when said liquid reservoir is empty, whereby said amphibious airplane can scoop water into said liquid reservoir for enhancing the fire extinguishing properties of the water.

2. The system according to claim 1 wherein said volumetric screw feeder is flexible.

3. The system according to claim 1 wherein said valve is a duckbill style check valve.

4. The system according to claim 1 including a solenoid valve electrically coupled to said controller, said solenoid valve open simultaneously with operation of said screw feeder.

5. The system according to claim 1 including a floating SS ball check valve constructed and arranged to prohibit flow of water into said screw feeder when said liquid reservoir is being filled.

6. The system according to claim 1 wherein said controller is remotely operated by an airplane crew member.

7. The system according to claim 1 wherein said super absorbent polymeric material is selected from the group consisting of cross-linked modified polyacrylamides, potassium acrylate, polyacrylamides, sodium acrylate, carboxymethylcellulose, alginic acid, cross-linked starches and crosslinked polyaminoacids.

\* \* \* \* \*